United States Patent
Kikuchi (10) Patent No.: US 6,885,521 B2
(45) Date of Patent: Apr. 26, 2005

(54) SHUTTER FOR DISC CARTRIDGE (75) Inventor: Shuichi Kikuchi, Miyagi (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 09/834,812

(22) Filed: Apr. 13, 2001

(65) Prior Publication Data
US 2002/0006107 A1 Jan. 17, 2002

(30) Foreign Application Priority Data
Apr. 14, 2000 (JP) .................................. 2000-112822

(51) Int. Cl.[7] .............................................. G11B 23/03
(52) U.S. Cl. .................................. 360/133; 720/738
(58) Field of Search ................................ 720/738, 744; 360/132, 133; 369/291

(56) References Cited

U.S. PATENT DOCUMENTS

| | | | | |
|---|---|---|---|---|
| 4,510,546 A | * | 4/1985 | Asami et al. ............... | 360/133 |
| 5,021,913 A | * | 6/1991 | Overland et al. ........... | 360/133 |
| 5,151,894 A | * | 9/1992 | Fujita ......................... | 369/291 |
| 5,161,080 A | * | 11/1992 | Funayama et al. .......... | 360/133 |
| 5,226,035 A | * | 7/1993 | Kato et al. .................. | 369/291 |
| 5,308,708 A | * | 5/1994 | Takeda et al. .............. | 428/610 |
| 5,454,251 A | * | 10/1995 | Funawatari et al. ......... | 72/337 |
| 5,467,239 A | * | 11/1995 | Fujisawa ..................... | 360/133 |
| 5,511,405 A | * | 4/1996 | Kikuchi ....................... | 72/337 |
| 5,512,111 A | * | 4/1996 | Tahara et al. ............... | 148/440 |
| 5,524,005 A | * | 6/1996 | Ikebe et al. ................. | 369/291 |
| 5,628,114 A | * | 5/1997 | Stern ..................... | 29/897.312 |
| 5,631,791 A | * | 5/1997 | Osaki et al. ................ | 360/133 |
| 5,729,272 A | * | 3/1998 | Kikuchi ...................... | 347/171 |
| 5,739,993 A | * | 4/1998 | Kikuchi et al. ............. | 360/133 |
| 5,889,639 A | * | 3/1999 | Swanson et al. ............ | 360/133 |
| 5,917,685 A | * | 6/1999 | Kikuchi et al. ............. | 360/133 |
| 6,069,778 A | * | 5/2000 | Kano et al. ................. | 360/132 |
| 6,542,459 B2 | * | 4/2003 | Miyazaki et al. ........... | 369/291 |

FOREIGN PATENT DOCUMENTS

JP        10-162541       *   6/1998

* cited by examiner

*Primary Examiner*—Brian E. Miller
(74) *Attorney, Agent, or Firm*—Frommer Lawrence & Haug LLP; William S. Frommer; Leonard J. Santisi (57) ABSTRACT

A metal shutter for use with a disc cartridge, has a following structure. A screen portion of the shutter is formed on an outside surface thereof with an indication area. The indication area includes a stamped rough surface part which is configured to constitute a given pattern. The screen portion is formed, on an inside surface thereof at a portion corresponding to the indication area, with another stamped rough surface area.

8 Claims, 10 Drawing Sheets

SHUTTER FOR DISC CARTRIDGE

BACKGROUND OF THE INVENTION

1. Field of the Invention

The present invention relates in general to a disc cartridge which is widely applied to the data processing field, and more particularly to a shutter which is slidably mounted on the disc cartridge to open and close a recording/reading opening formed in the disc cartridge. More specifically, the present invention is concerned with the shutter, method of producing the shutter and a device for producing the shutter.

2. Description of the Prior Art

In order to clarify the task of the present invention, some conventional shutters for disc cartridges will be briefly described with reference to FIGS. 12 to 14 of the accompanying drawings.

Figure 12:
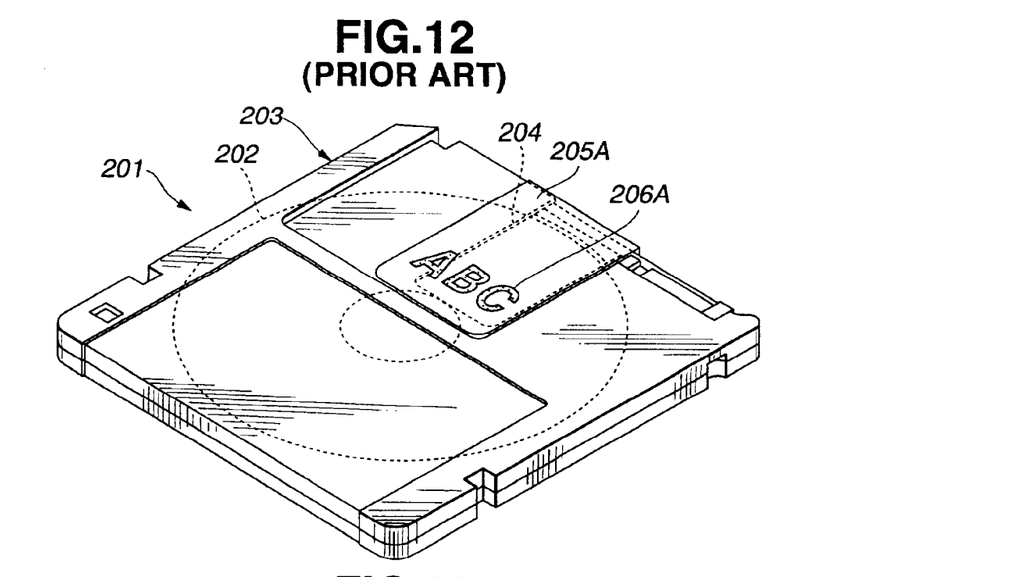
FIG. 12 is a perspective view of a disc cartridge having a conventional shutter slidably mounted thereon.

In FIG. 12, there is shown a disc cartridge 201. The disc cartridge 201 comprises generally a disc 202 which is a recording medium, a shell 203 which rotatably receives therein the disc 202, an opening 204 which is formed in the shell 203 to expose upper and lower surfaces of the disc 203 and a shutter 205A which is slidably mounted on the shell 203 to selectively open and close the opening 204. When recording or reading is needed, the shutter 205A is slid to open the opening 204 and a recording/reading head (not shown) is brought into the opening 204 to carry out recording information to the disc 202 or reading information from the disc 202.

The known shutter 205A is made of a metal plate, such as stainless steel plate (SUS) or the like and constructed to have a generally U-shaped cross section. On an upper surface of the shutter 205A, there is formed an indication area 206A where characters and figures (or given patterns), such as the name of maker of the disc cartridge 201, specification of the disc 202 and the like, are printed. Usually, the characters and figures are printed on the indication area 206A using an ultraviolet-sensitive ink and then cured in a certain condition. In this case, printing and curing devices are inevitably needed, which however brings about increase in cost of the disc cartridge 201.

Figure 13:
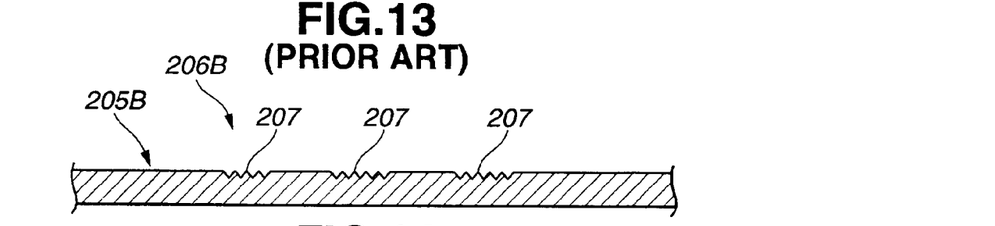
FIG. 13 is an enlarged sectional view of an indication area of another conventional shutter.
Figure 14:
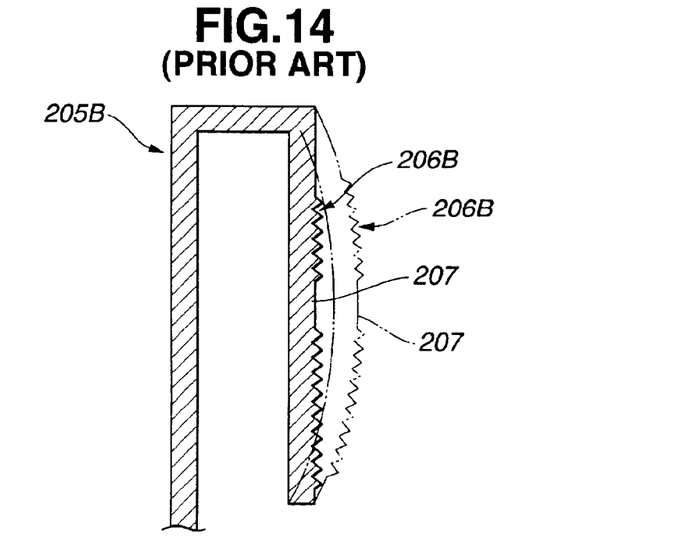
FIG. 14 is an enlarged sectional view of the shutter of FIG. 13, showing an undesirable swelled phenomenon of the indication area.

In FIGS. 13 and 14, there is shown another known shutter 205B which is to be slidably mounted on the shell 203 (see FIG. 12) in the same manner as is described hereinabove. As is seen from FIG. 13, on an upper surface of the shutter 205B, there is also formed an indication area 206B. However, the indication area 206B of this shutter 205B is provided by stamping (or pressing) given portions 207 of the upper surface with a lo stamping die having a rough work surface. Due to the stamping, each given portion 207 has a rough surface. The given portions 207 having such rough surfaces are arranged to surround given non-rough portions of the indication area 206B in such a manner that the given non-rough portions constitute given characters or figures which stand out against the background (viz., the given portions 207 having rough surfaces) of the indication area 206B. In case of this shutter 105B, only a stamping machine is needed for providing the shutter 105B with the indication area 206B.

However, even the shutter 105B has the following shortcomings.

(1) Due to the nature of the indication area 206B provided by the stamping, it sometimes to fail to give a satisfied visibility and clarity of the characters and figures to viewers. Particularly, when the metal plate of the shutter 205B has not a sufficient thickness, the visibility and clarity of them become much poor because in such case, the roughness of the stamped given portions 207 becomes too fine to provide clearly defined non-rough portions on the indication area 206B, by which the given characters or figures stand out against the background of the indication area 206B.

(2) Furthermore, as is shown in FIG. 14, when the indication area 206B has a plurality of stamped portions 207 formed thereon, the indication area 206B tends to swell out as is indicated by phantom lines. That is, due to provision of such numerous stamped portions 207, the outside surface area of the indication area 206B is increased causing such undesirable outward expansion.

SUMMARY OF THE INVENTION

It is therefore an object of the present invention to provide a shutter for a disc cartridge, which is free of the above-mentioned drawbacks.

According to a first aspect of the present invention, there is provided a metal shutter for use with a disc cartridge, which comprises a screen portion which is formed on an outside surface thereof with an indication area, the indication area including a stamped rough surface part which is configured to constitute a given pattern, the screen portion being formed, on an inside surface thereof at a portion corresponding to the indication area, with another stamped rough surface area.

According to a second aspect of the present invention, there is provided a metal shutter for use with a disc cartridge, which comprises larger and smaller rectangular screen portions which are connected through a thinner connecting portion thereby to have a generally U-shaped cross section, the smaller rectangular screen portion having an inside surface which faces an inside surface of the larger rectangular screen portion and an outside surface which faces outside; a first stamped rough outside surface part integral with the outside surface of the smaller rectangular screen portion; a non-rough outside surface part integral with the outside surface of the smaller rectangular screen portion, the non-rough outside surface being surrounded by the first stamped rough outside surface part thereby to constitute a given pattern which stands out against the stamped rough outside surface part; a first stamped rough inside surface part which is integral with the inside surface of the smaller rectangular screen portion at a position corresponding to the first stamped rough outside surface part; a second stamped rough outside surface part integral with the outside surface of the smaller rectangular screen portion at a position remote from the first stamped rough outside surface part, the second stamped rough outside surface part being configured to form a given pattern; and a second stamped rough inside surface part integral with the inside surface of said smaller rectangular screen portion at a position corresponding to the second stamped rough outside surface part.

According to a third aspect of the present invention, there is provided a method of producing a shutter for use with a disc cartridge, which comprises the steps of preparing upper and lower stamping dies which have mutually contactable work faces; lo supplying a metal plate material between the upper and lower stamping dies; and stamping the metal plate material with the upper and lower stamping dies to produce, at the same time, on an outside surface thereof a first rough surface part and on an inside surface thereof a second rough surface part, the first rough surface part being configured to constitute a given pattern.

According to a fourth aspect of the present invention, there is provided a device for producing a shutter for use with a disc cartridge, which comprises upper and lower stamping dies between and by which a metal plate material for producing the shutter is stamped, a first rough surface defined by the upper stamping die, the first rough surface producing an indication area on an upper surface of the metal plate material upon stamping, the indication area including a stamped rough surface which is configured to constitute a given pattern; and a second rough surface defined by the lower stamping die, the second rough surface producing a stamped rough surface part on a lower surface of the metal plate material at a position corresponding to the indication area upon stamping.

According to fifth aspect of the present invention, there is provided a disc cartridge which comprises a disc as a recording medium; a shell for rotatably receiving therein the disc; an opening formed in the shell to expose an outer surface of the disc; and a metal shutter slidably mounted on the shell to open and close the opening, wherein the metal shutter is provided with a screen portion, the screen portion being formed on an outside surface thereof with an indication area, the indication area including a stamped rough surface part which is configured to constitute a given pattern; and wherein the screen portion is formed, on an inside surface thereof at a portion corresponding to the indication area, with another stamped rough surface part.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Figure 1:
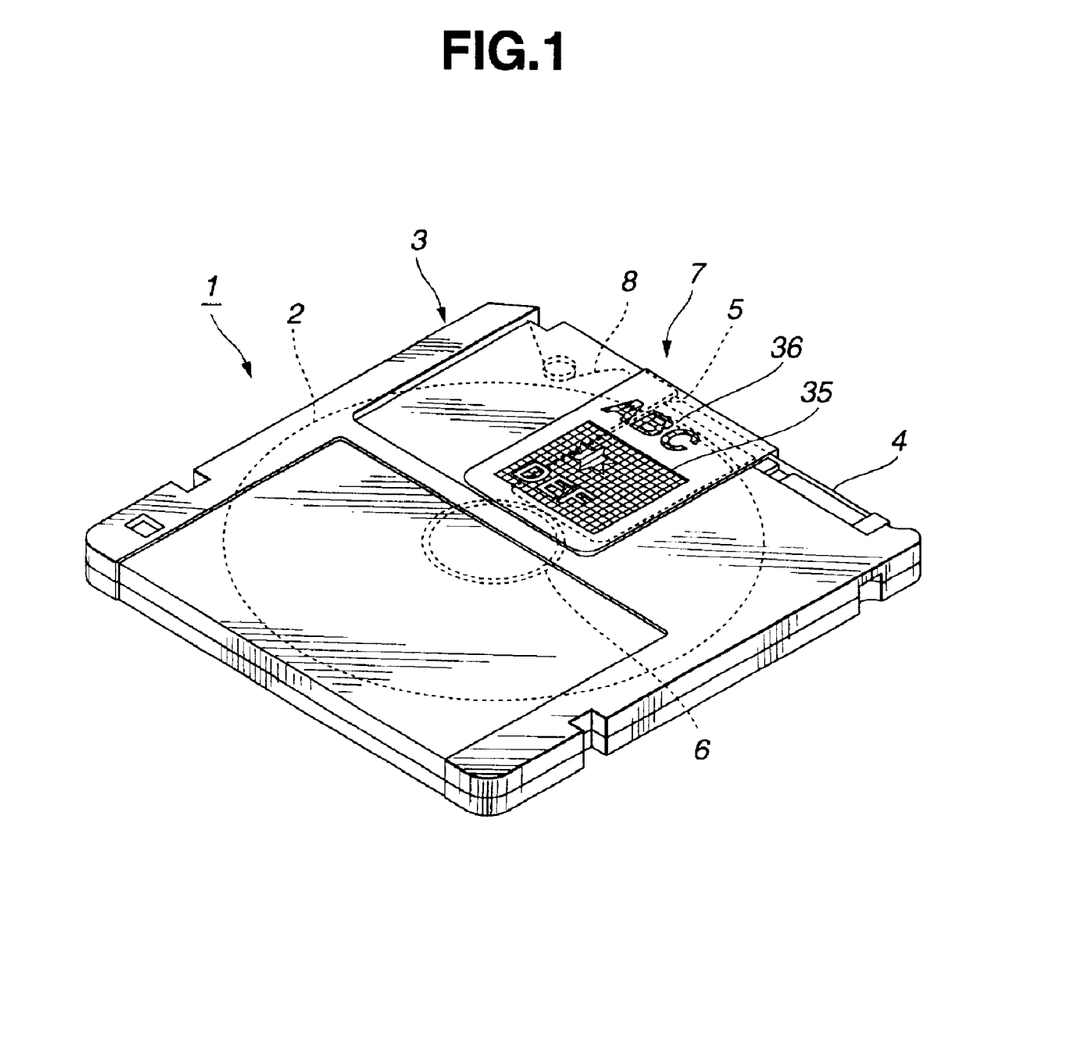
FIG. 1 is a perspective view of a disc cartridge having a shutter of the present invention slidably mounted thereon.
Figure 2:
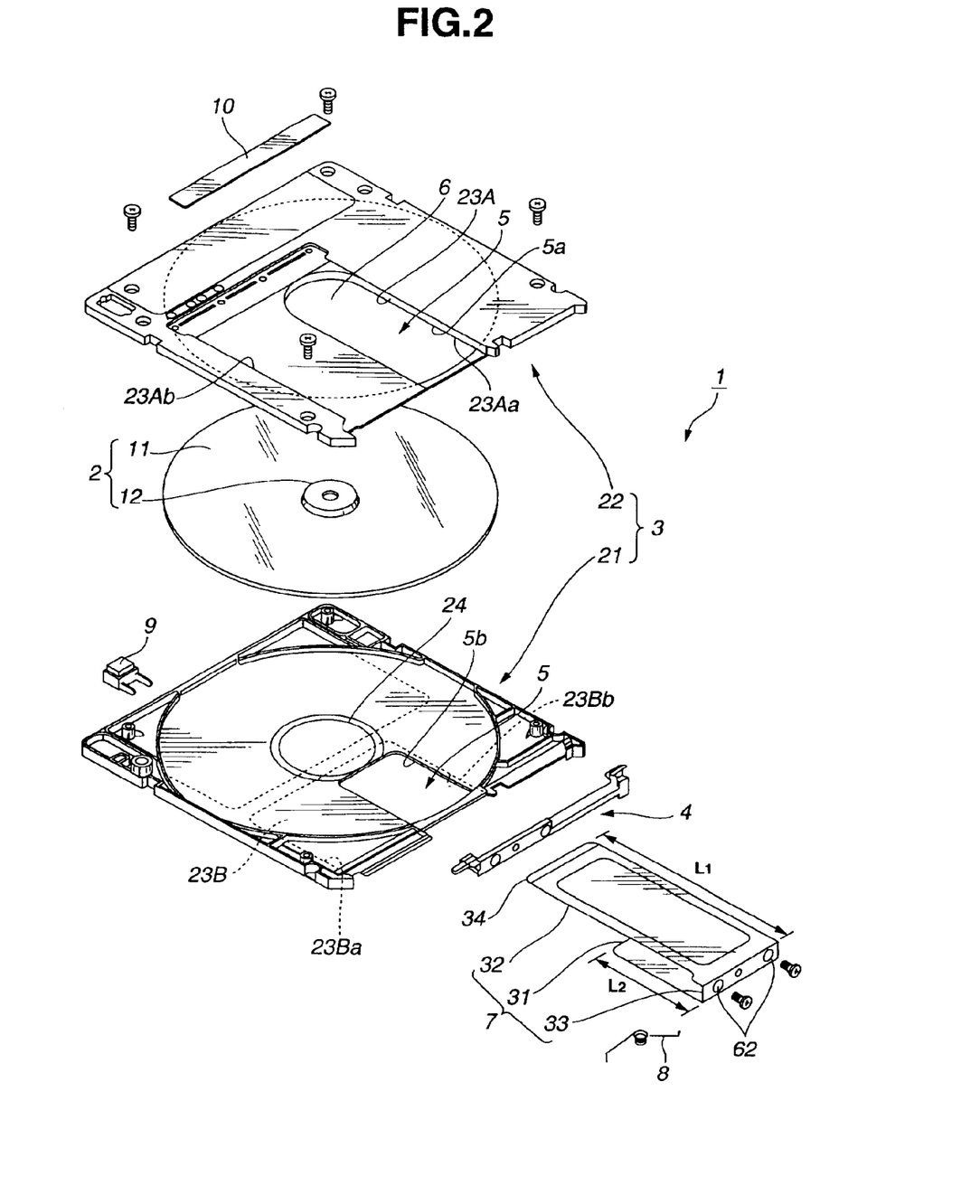
FIG. 2 is an exploded view of the disc cartridge, taken from a bottom side of the disc cartridge.

Referring to FIGS. 1 and 2, there is shown a disc cartridge 1 to which a shutter 7 of the present invention is practically applied.

As is seen from FIG. 1, the disc cartridge 1 generally comprises a disc 2 which is a recording medium, a shell 3 which rotatably receives therein the disc 2, a rectangular opening 5 which is formed in a front part of the shell 3 to expose upper and lower surfaces of the disc 2, a circular opening 6 which is formed in a center part of the shell 3 to introduce thereinto a drive shaft of a disc player (not shown), a shutter 7 which is slidably mounted through a guide member 4 to the front part of the shell 3 for selectively opening and closing the rectangular opening 5, a spring 8 which is arranged in the shell 3 to bias the shutter 7 toward the close position, a write-protector 9 (see FIG. 2) which functions to prevent miss-erasing and a shutter guide 10 (see FIG. 2) which guides the shutter 7.

As is seen from FIG. 2 which is a view taken from a bottom side of the disc cartridge 1, the disc 2 comprises a data recording disc plate 11 and a metal hub 12 fixed to a center of the disc plate 11. The shell 3 comprises upper and lower shell halves 21 and 22 which are coupled to constitute a flat rectangular container for containing therein the disc 2. The lower shell half 22 (illustrated in an upper area of FIG. 2) has at a center part thereof the circular opening 6. The rectangular opening 5, more specifically, a lower open part 5a of the opening 5 which is formed in the lower shell half 22 is merged with the circular opening 6. In assembly of the disc cartridge 1, a lower part of the metal hub 12 of the disc 2 is slidably put into the circular opening 6 and a lower recording surface of the disc plate 11 faces the lower open part 5a of the opening 5.

As is seen from FIG. 2, the lower shell half 22 is formed at its outside surface with a shallow rectangular recess 23A which serves as a shutter sliding area. As shown, the rectangular recess 23A has opposed end walls 23Aa and 23Ab. The shutter 7 slides in the recess 23 between a close position wherein both the lower open part 5a of the opening 5 and the circular opening 6 are closed by the shutter 7 and an open position wherein both the lower open part 5a and the circular opening 6 are opened by the shutter 7. When the shutter 7 assumes the close position, one edge of the shutter 7 abuts against the end wall 23Aa, while, when the shutter 7 assumes the open position, the other edge of the shutter abuts against the other end wall 23Ab.

As is seen from FIG. 2, the upper shell half 21 (illustrated in a lower part of the drawing) is formed at a center part of an inner surface thereof with a circular ridge 24. The rectangular opening 5, more specifically, an upper open part 5b of the opening 5 which is formed in the upper shell half 21 extends from a peripheral portion of the circular ridge 24. In assembly of the disc cartridge 1, an upper part of the metal hub 12 of the disc 2 faces the inside of the circular ridge 24 and an upper recording surface of the disc plate 11 faces the upper open part 5b of the opening 5.

Furthermore, similar to the above-mentioned lower shell half 22, the upper shell half 21 is formed at its outside surface with a shallow rectangular recess 23B which serves as a shutter sliding area. The rectangular recess 23B has opposed end walls 23Ba and 23Bb. When the shutter 7 comes to the close position abutting at one edge thereof against the end wall 23Bb, the upper open part 5b of the opening 5 is closed by the shutter 7, while, when the shutter 7 comes to the open position abutting at the other edge thereof against the end wall 23Ba, the upper open part 5b is opened by the shutter 7. As will be described in detail in the following, the shutter 7 has a generally U-shaped cross section and is arranged to straddle the upper and lower recesses 23B and 23A of the coupled shell halves 21 and 22.

As is seen from FIG. 2, the shutter 7 comprises larger and smaller rectangular screen portions 32 and 31 and a thinner connecting portion 33 through which the screen portions 32 and 31 are connected. In assembly of the disc cartridge 1, the larger screen portion 32 is received in the recess 23A of the lower shell half 22, the smaller screen portion 31 is received in the recess 23B of the upper shell half 21 and the thinner connecting portion 33 straddles the front edge of the coupled shell halves 21 and 22. The thinner connecting portion 33 is bolted to the guide member 4, so that the shutter 7 and the guide member 4 move together like a single unit.

As is seen from FIG. 2, the larger screen portion 32 has such a length "L1" as to close both the circular opening 6 and the lower open part 5a of the opening 5, and the smaller screen portion 31 has such a length "L2" as to close the upper open part 5b of the opening 5. At a leading end of the larger screen portion 32, there is formed a bent back portion 34 which is slidably engaged with the shutter guide 10 which is bolted to the outside surface of the lower shell half 22.

Figure 3:
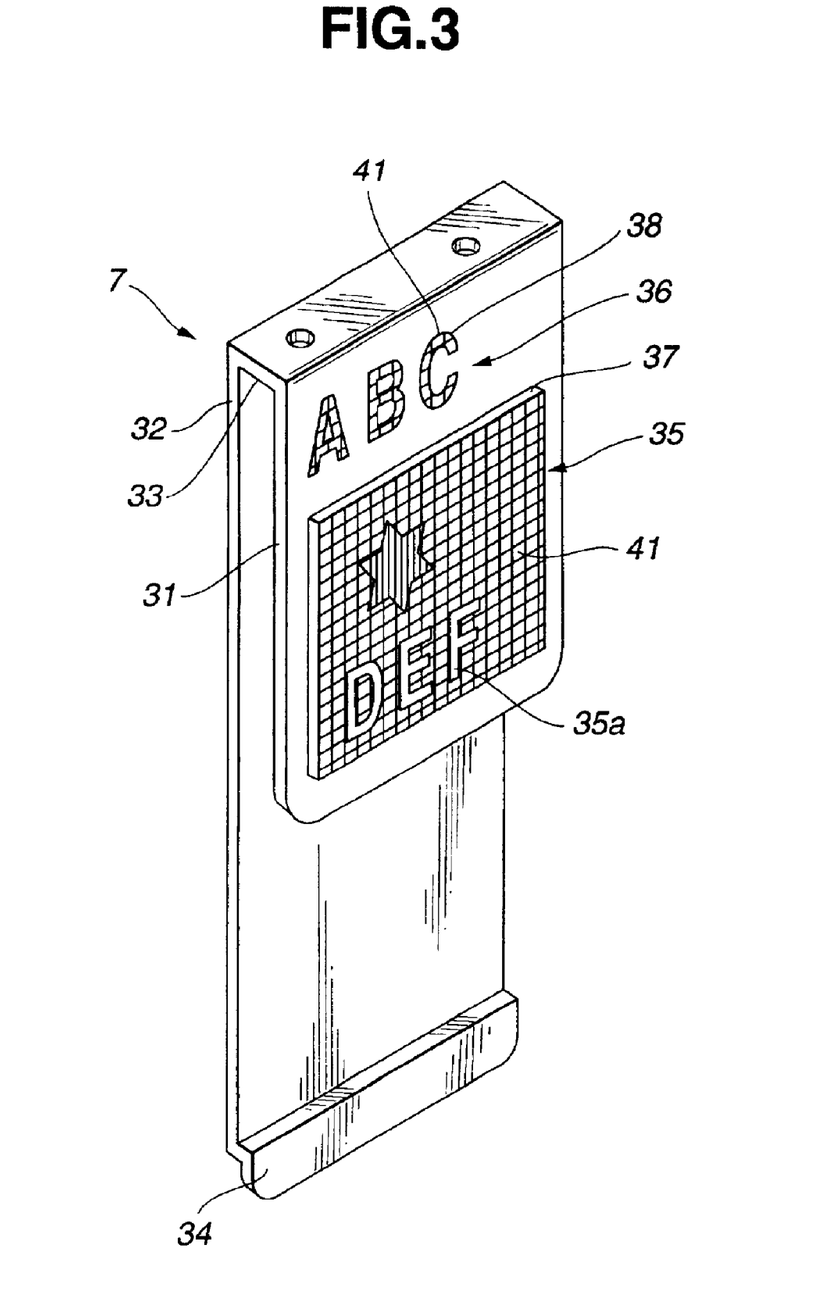
FIG. 3 is an enlarged perspective view of the shutter of the present invention.

As is seen from FIG. 3, the smaller screen portion 31 is formed at its outside surface with both a first indication area 35 and a second indication area 36. On these first and second indication areas 35 and 36, there are provided given characters and figures, such as the maker name, specification of the disc 2 and the like. As shown, the first indication area 35 is provided on a first flat projection 37 and the second indication area 36 is provided on a second flat projection 38 whose projection degree is smaller than that of the first flat projection 37.

Figure 4:
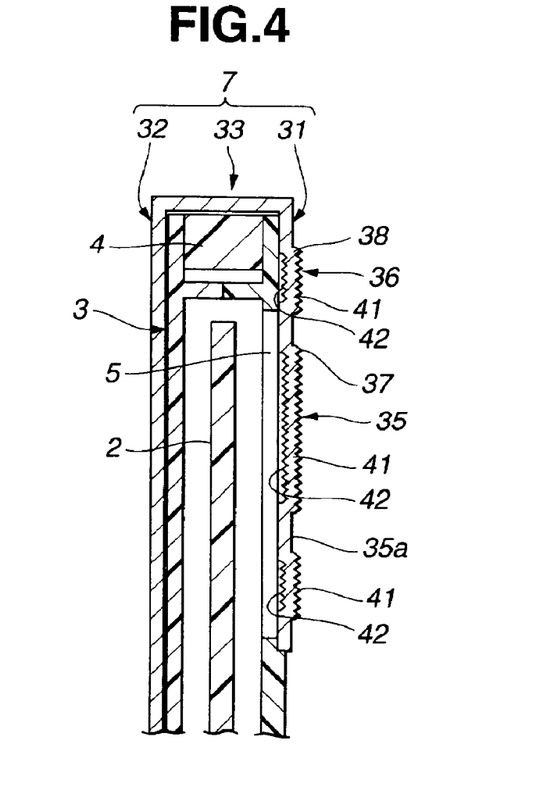
FIG. 4 is an enlarged sectional view of a portion of the shutter of the present invention.

As is seen from FIGS. 3 and 4, the first indication area 35 is provided by stamping substantially entire portion of the first flat projection 37 except given portions 35a by which the characters or figures are defined. More specifically, the first indication area 35 is provided by stamping given surface part 41 of the first flat projection 37 from front and back sides with after-mentioned two (viz., upper and lower) stamping dies each having a rough work surface.

As will be described in detail hereinafter, the first and second indication areas 35 and 36 are produced while a long metal plate material for the shutter 7 is conveyed toward a work section (viz., seventh step) at which each shutter 7 is cut out from the material. The first and second indication areas 35 and 36 are provided by pressing or stamping the metal plate material by and between the two stamping dies. Thus, each given surface part 41 provided on the first and second indication areas 35 and 36 has both a rough outside surface part 41 and a rough inside surface part 42, as is shown in FIG. 4.

The given surface parts 41 of the first indication area 35 are arranged to surround the non-rough given portions 35a in such a manner that the non-rough given portions 35a constitute given characters or figures which stand out against the background (viz., the given surface parts 41 having rough surfaces) of the first indication area 35. While, the characters or figures on the second indication area 36 are provided or defined by only the given surface parts 41 having rough surfaces.

As the metal plate material for producing the shutter 7, a beltlike aluminum plate material or stainless steel plate material having a thickness "T" of about 0.3 mm is used. Preferably, the metal plate material is subjected to anodization treatment or plastic coating before being subjected to the stamping process. By bending a flat piece cut out from the metal plate material, the shutter 7 is produced, as will become apparent as the description proceeds.

Figure 5:
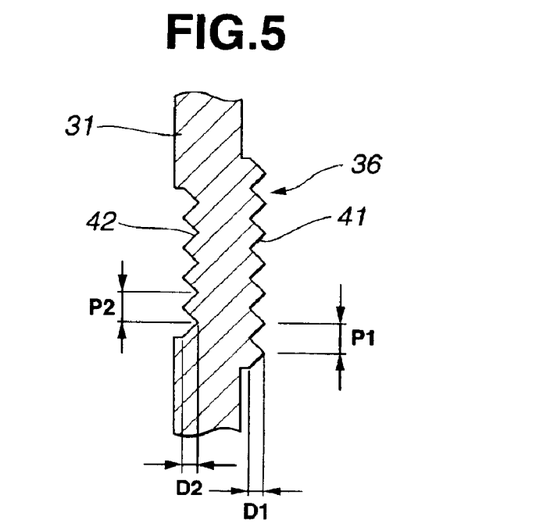
FIG. 5 is a much enlarged sectional view of an essential portion of the shutter of the present invention.

As is seen from FIG. 5, the grain of the rough outside surface part 41 is arranged to form a grid pattern and has a pitch (P1) of about 0.2 mm and a depth (D1) of about 0.010 mm. While, the grain of the rough inside surface part 42 is arranged to form a striped pattern and has a pitch (P2) of about 0.2 mm and a depth (D2) of about 0.007 mm.

As is seen from FIG. 4, the rough inside surface part 42 does not contact the shell 3, more specifically, the bottom surface of the shallow rectangular recess 23B of the upper shell half 21. As will be described hereinafter, the rough outside and inside surface parts 41 and 42 are simultaneously produced by a stamping device.

In the following, method of producing the shutter 7 will be described with reference to FIGS. 6, 7 and 8.

Figure 6:
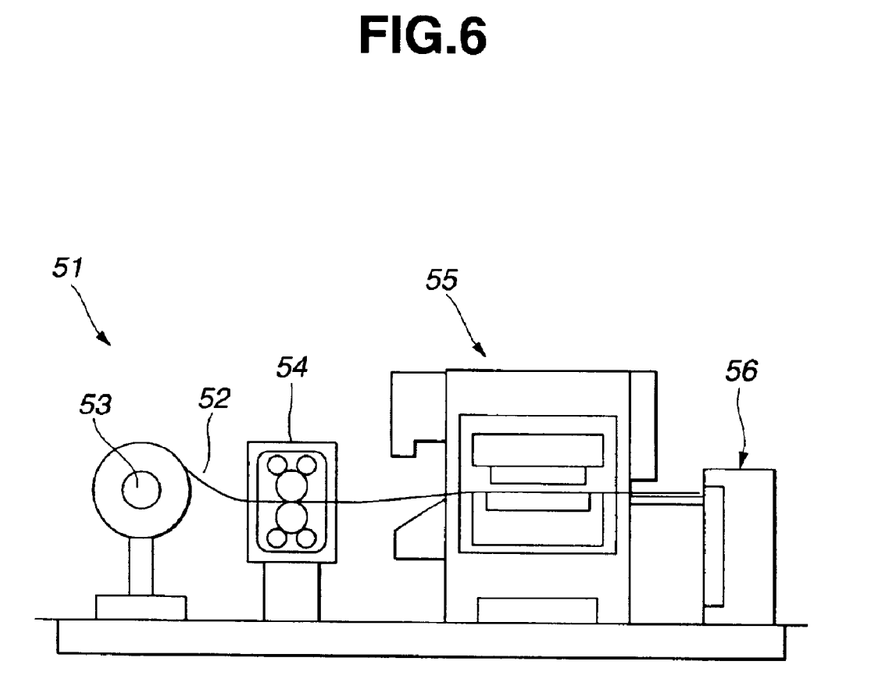
FIG. 6 is a schematic front view of a production line for producing the shutter of the present invention.

In FIG. 6, there is shown a production line 51 for producing the shutter 7. The production line 51 comprises a metal plate supplier 53 by which a long metal plate material 52 for producing the shutter 7 is supplied, a leveling device 54 by which the long metal plate material 52 from the supplier 53 is accurately leveled, a transfer press unit 55 by which the long metal plate material 52 from the leveling device 54 is subjected to various pressing, punching and stamping steps one after another to produce the shutters 7, and an arraying device 56 by which the shutters 7 from the transfer press unit 55 are arrayed for a subsequent processing.

Figure 7:
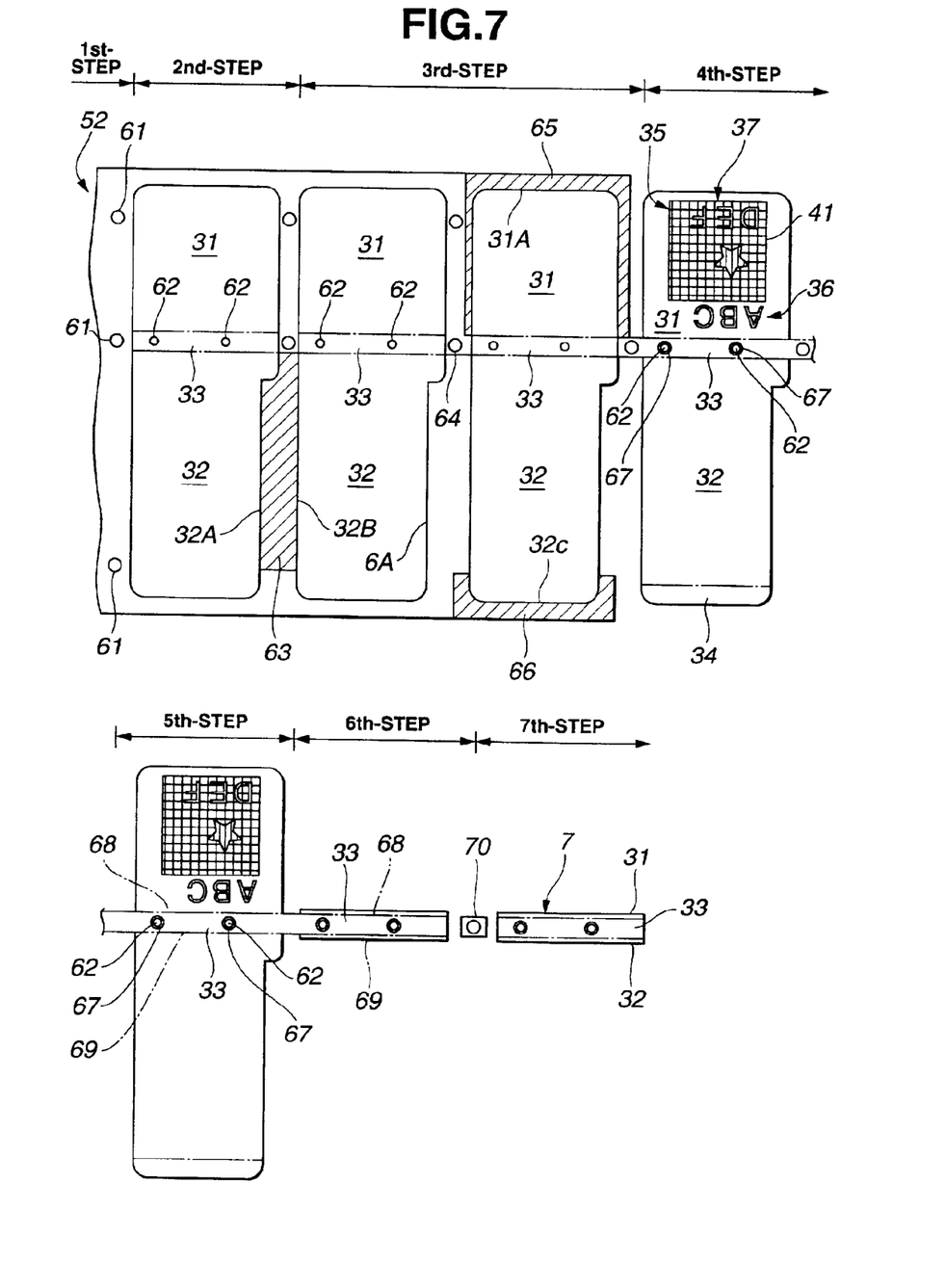
FIG. 7 is a view showing pressing and stamping processes for producing the shutter.

FIG. 7 depicts the various working steps carried out by the transfer press unit 55.

At a first step, the metal plate material 52 is punched to produce pilot openings 61 therein, which are used for accurately conveying the metal plate material 52 along a guide way defined in the transfer press unit 55.

At a second step, by punching, two openings 62 and an elongate opening 63 are produced in the metal plate material 52. The two openings 62 are the openings through which two vises (or bolts) pass for connecting the shutter 7 to the guide member 4 (see FIG. 2). By the elongate opening 63 thus cut out, one side edge 32A of a larger rectangular screen portion 32 for one shutter and the other side edge 32B of that for another shutter that has gone ahead are simultaneously produced.

At a third step, by punching, laterally end portions 65 and 66 of the metal plate material 52 are simultaneously cut out to define or form leading edges 32c and 31A of the larger and smaller rectangular screen portions 32 and 31 of the shutter. By this third step, flat pieces for respective shutters are produced, which are connected through a thin strip 64.

Then, at a fourth step, by punching, the two openings 62 are rimmed at 67 and a bent portion 34 is formed at the leading end of the longer rectangular screen portion 32. At the same time, by applying a stamping work to each flat piece by using after-mentioned upper and lower stamping dies, the above-mentioned first and second indication areas 35 and 36 are formed on the smaller rectangular screen portion 36. As is described hereinabove, these first and second indication areas 35 and 36 are provided on first and second flat projections 37 and 38 which are formed on the outside surface of the smaller rectangular screen portion 31, as is understood from FIG. 3. Each of the upper and lower dies has a work face which is machined to have a rough surface. That is, the rough work faces of the upper and lower dies are configured to produce the first and second indication areas 35 and 36 on the smaller rectangular screen portion 31 when the portion 31 is stamped by the two dies. Due to usage of the upper and lower stamping dies each having the rough work face, also the inside surface part 42 of the smaller rectangular screen portion 32 is configured rough.

It has been revealed that the above-mentioned fourth step for producing the first and second indication areas 35 and 36 on the smaller rectangular screen portion 31 does not induce an undesired swelling of the screen portion 31 such as one 207 as shown in FIG. 14. The inventor considers that providing the outside and inside surfaces of the screen portion 31 with respective rough surfaces would bring about a balanced dispersion/absorption of stress (or compressive strain) therefrom and thereinto when the screen portion 31 is pressed or stamped between the two stamping dies.

Then, at a fifth step, the shape of each vis opening 62 is corrected.

At a sixth step, by pressing, the larger and smaller rectangular screen portions 32 and 31 of each flat piece are bent perpendicular relative to the thinner connecting portion 33. That is, the larger screen portion 32 is bent along an imaginary line 69 and the smaller screen portion 31 is bent along another imaginary line 68. With this, each piece is shaped to have a generally U-shaped cross section.

At a seventh step, each bent piece is separated from the remaining by cutting a connecting portion 70. With this, the shutter 7 is produced. The shutters 7 thus produced at this step are conveyed toward the arraying device 56.

Figure 8:
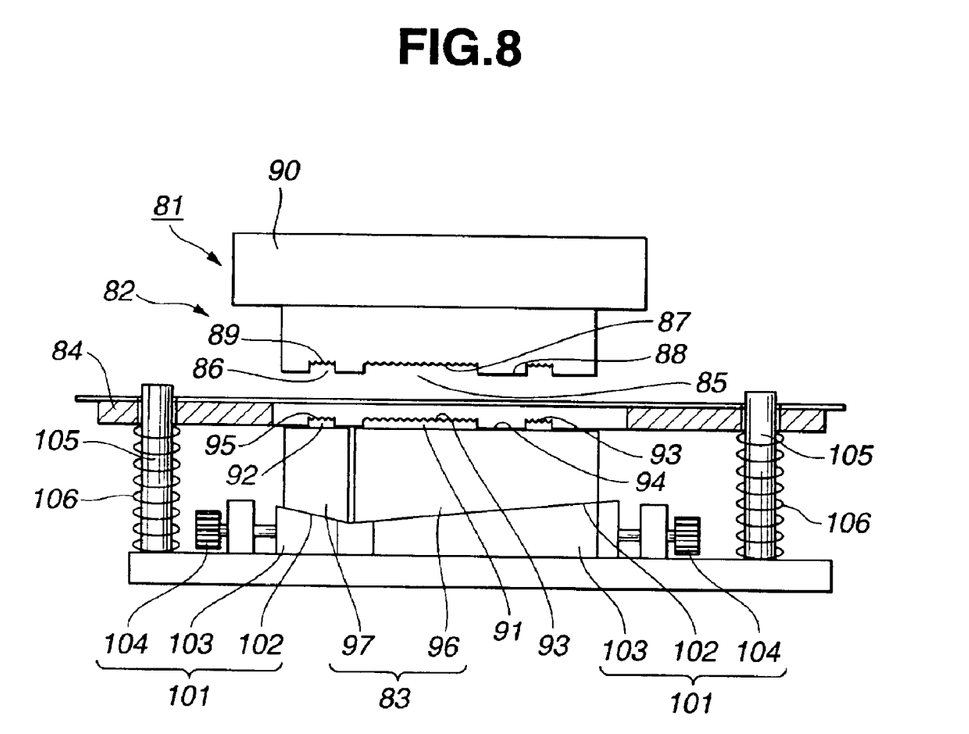
FIG. 8 is a schematic sectional view of a stamping machine for providing the shutter with an indication area.
Figure 9A:
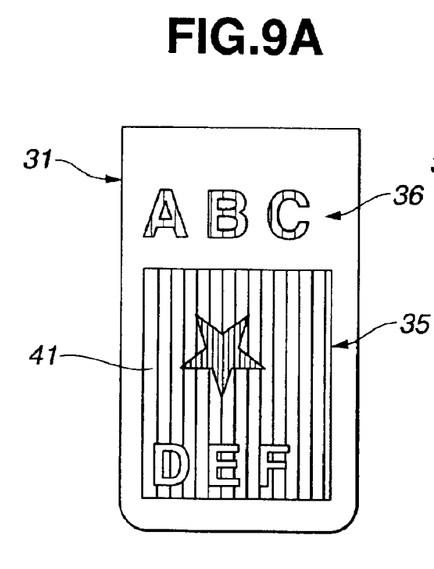
FIGS. 9A to 9D are views of four different indication areas.
Figure 9B:
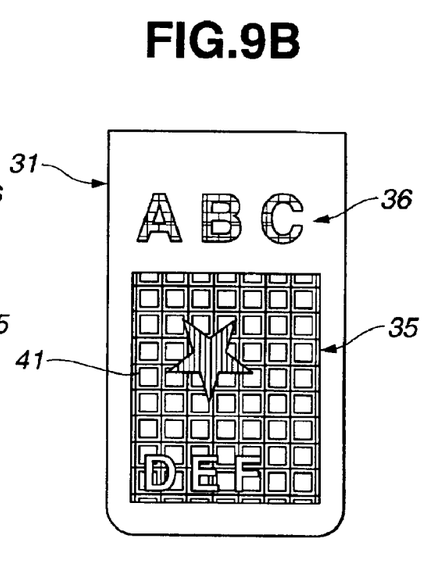
Figure 9C:
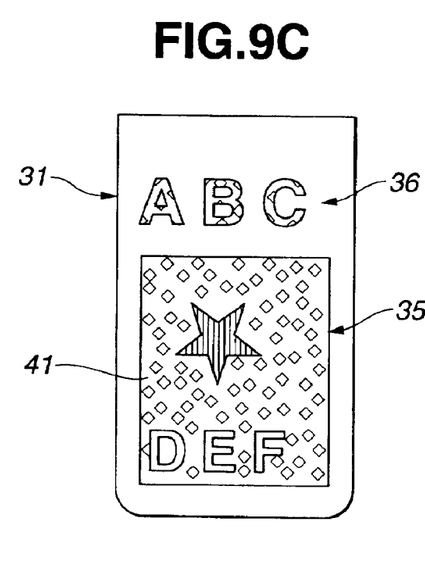
Figure 9D:
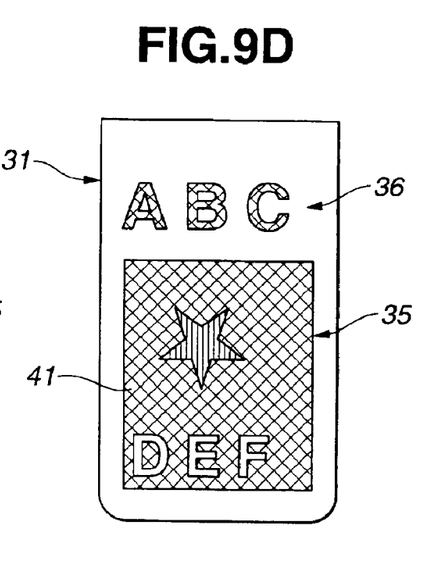

Referring to FIG. 8, there is shown a stamping device 81 installed in the above-mentioned transfer press unit 55, by which the above-mentioned fourth step of FIG. 7 is practically carried out.

As shown in the drawing, the stamping device 81 comprises generally an upper stamping die 82, a lower stamping die 83 and a supporting table 84 on which the long metal plate material 52 is axially movably supported. The upper stamping die 82 is driven by a hydraulic cylinder 90. As shown, the supporting table 84 is formed with an aperture (no numeral) at a portion between the lower and upper stamping dies 83 and 82. The metal plate material 52 extends across the aperture.

The upper stamping die 82 is formed with a lower work face which has first and second recesses 85 and 86. In operation, the first and second recesses 85 and 86 function to produce the first and second flat projections 37 and 38 (viz., first and second indication areas 35 and 36) on the smaller rectangular screen portion 32 in cooperation with the lower stamping die 83.

A bottom surface of the first recess 85 is machined to have a rough surface 87, and from the bottom surface of the first recess 85, there are raised flat projections 88 (only one is shown). The rough surface 87 is used for producing the rough outside surface part 41 of the first indication area 35 of the shutter 7, and the flat projections 88 are used for producing the non-rough portions 35*a* of the first indication area 35, as will be well understood when referring to FIG. 3. A bottom surface of the second recess 86 is machined to have a rough surface 89 which is used for producing the rough surface part 41 of the second indication area 36 of the shutter 7, as will be well understood when referring to FIG. 3.

The lower stamping die 83 is formed with an upper work face which has first and second projections 91 and 92. In operation, the first and second projections 91 and 92 function to produce the first and second flat projections 37 and 38 (viz., first and second indication areas 35 and 36) on the smaller rectangular screen portion 32 in cooperation with the above-mentioned first and second recesses 85 and 86 of the upper stamping die 82.

An upper surface of the first projection 91 is machined to have a rough surface 93, and the upper surface of the first projection 91 is provided with recesses 94 (only one is shown). The rough surface 93 are used for producing the rough inside surface part 42 of the first indication area 35 of the shutter 7 in cooperation with the rough surface 87 of the first recess 85 of the upper stamping die 82, and the recesses 94 are used for producing the non-rough portions 35*a* of the first indication area 35 in cooperation with the flat projections 88 of the first recess 85 of the upper stamping die 82, as will be well understood when referring to FIG. 4. An upper surface of the second projection 92 is machined to have a rough surface 95 which is used for producing the rough inside surface part 42 of the second indication area 36, as will be well understood when referring to FIG. 4.

The lower stamping die 83 is of a split type, including a first lower die section 96 having the above-mentioned first projection 91 formed thereon and a second lower die section 97 having the above-mentioned second projection 92 formed thereon.

These two lower die sections 96 and 97 can be independently adjusted in height by respective height adjusting devices 101.

Each height adjusting device 101 comprises a sliding seat 103 which supports thereon the die section 96 or 97 through mutually contacting slanted surfaces 102 provided by the seat 103 and the die section 96 or 97, and a drive unit 104 which slides the die section 96 or 97. As will be easily understood from the drawing, when the sliding seat 103 is slid by the drive unit 104, the seat 103 functions to lift or lower the die section 96 or 97 due to presence of the slanted surfaces 102. Thus, the heights of the first and second die sections 96 and 97 can be independently adjusted.

The supporting table 84 holds the long metal plate material 52 at such a level as not to induce a contact between the first and second projections 91 and 92 of the lower stamping die 83. and the metal plate material 52. With this, the metal plate material 52 is protected from being scratched by the projections 91 and 92, and the first and second projections 91 and 92 are protected from being unnecessarily worn away by the metal plate material 52.

The supporting table 84 have openings (no numerals) into which upper portions of supporting pillars 105 are loosely inserted. Respective coil springs 106 are disposed about the pillars 105 to resiliently support the supporting table 84. Thus, if receiving an abnormally big external force from the above, the supporting table 84 is softly lowered due to function of the springs 106. When, in operation, the long metal plate material 52 is conveyed onto a given place of the supporting table 84, the upper stamping die 82 is moved down by the hydraulic cylinder 90 to press or stamp the metal plate material 52 by and between the upper and lower stamping dies 82 and 83. With this, the work of the above-mentioned fourth step of FIG. 7 is carried out at the same time.

In order to obtain satisfied first and second indication areas 35 and 36 on the smaller screen portion 31 of the shutter 7 by the stamping device 81, some tests have been carried out by the inventor, which are as follows.

That is, one upper stamping die 82 was prepared, which had the rough bottom surfaces 87 and 89 of the first and second recesses 85 and 86. The roughness of the rough bottom surfaces 87 and 89 was about 30 $\mu$m. Three, viz., first, second and third lower stamping dies 83 were prepared, which respectively had the rough upper surfaces 93 and 95 of the first and second projections 91 and 92. The roughness of the rough upper surfaces 93 and 95 was about 3 to 4 μm in the first lower stamping die (83), about 7 to 8 μm in the second lower stamping die (83) and 0 (zero) in the third lower stamping die (83). By combining the upper stamping die 82 with each of the three lower stamping dies (83), three types of stamping tests were carried out using the long metal plate material 52. After stamping, a transcription degree (vi., roughness) of the stamped outside rough surface part 41 of the first indication area 35 was measured for respective shutters 7. The results of the tests are shown in TABLE-1. A transcription rate is derived by dividing the transcription degree by the roughness (viz., 30 μm) of the rough bottom surface 87 of the upper stamping die 82.

TABLE-1

| Roughness of lower die | 3–4 μm | 7–8 μm | 0 |
|---|---|---|---|
| Transcription degree of stamped outside rough surface | 7–8 μm | 20 μm | 4 μm |
| Transcription rate | 25% | 67% | 13.3% |
| Roughness of Lower die/ Roughness of Upper die | 10% | 23%–27% | |

As is seen from the TABLE-1, when the lower stamping die 83 has the rough upper surface 93 or 95 whose roughness is greater than 3 to 4 am, the transcription rate obtained by the indication area of the shutter 7 is greater than twice as much as that obtained by an indication area that is provided by a lower stamping die having no rough surface.

FIGS. 9A, 9B, 9C and 9D show four smaller screen portions 31 having different types of the first indication area 35. That is, the first indication areas 35 of these screen portions 31 have different rough outside surface parts 41 respectively. In the first indication area 35 of the screen portion 31 of FIG. 9A, the rough outside surface part 41 is pressed or stamped to have a striped pattern. In the first indication area 35 of FIG. 9B, the rough outside surface part 41 is pressed or stamped to have a tessellated pattern. In the first indication area 35 of FIG. 9C, the rough outside surface part 41 is pressed or stamped to have a satin finished surface and in the first indication area 35 of FIG. 9D, the rough outside surface part 41 is pressed or stamped to have a grid pattern. As has been described hereinabove, each of the smaller screen portions 9A, 9B, 9C and 9D has at a reversed side of the rough outside surface part 41 the rough inside surface part 42, which suppresses the undesired swelling of the smaller screen portion 31.

Figure 10:
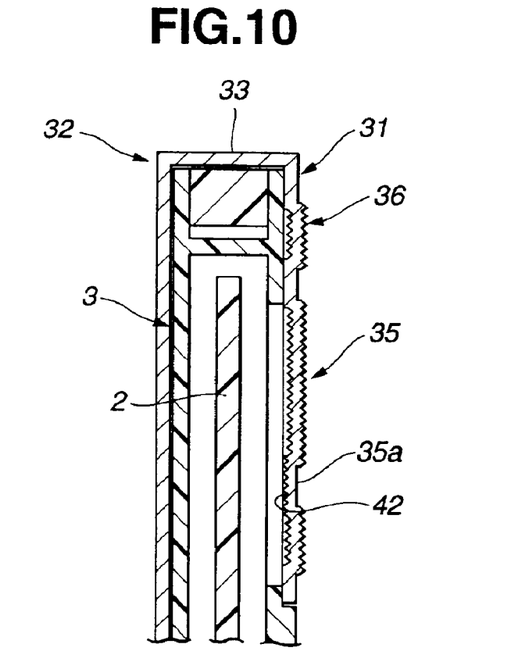
FIG. 10 is a view similar to FIG. 4, but showing a modification of the shutter of the present invention.

Referring to FIG. 10, there is shown a modification of the shutter 7 of the present invention. In this modification, the non-rough given portions 35a constituting the given characters or figures have rough inside surface parts 42, as will be well understood when referring to FIG. 4. In the illustrated modification, the rough inside surface parts 42 are in contact with the outer surface of the shell 3.

Figure 11:
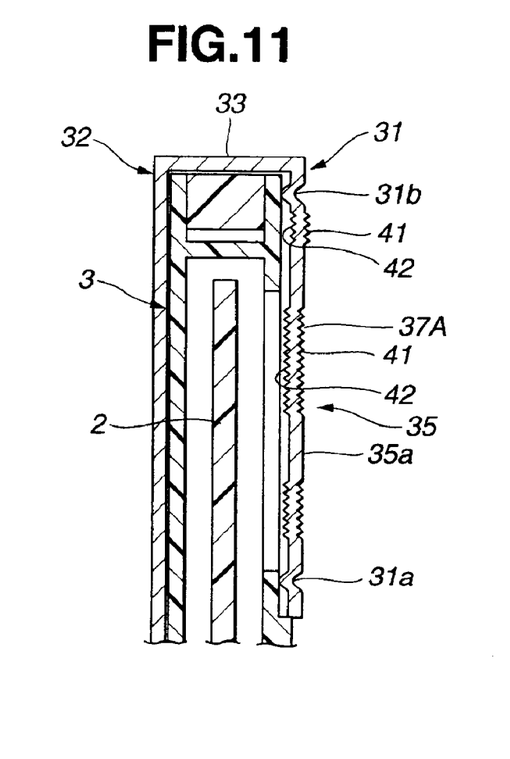
FIG. 11 is a view similar to FIG. 4, but showing another modification of the shutter of the present invention.

Referring to FIG. 11, there is shown another modification of the shutter 7 of the invention. In this modification, the first indication area 35 is provided by a recessed portion 37A formed on the outside surface of the smaller rectangular screen portion 31. That is, in this modification, there is no means that corresponds to the above-mentioned first flat projection 37 formed on the outside surface of the portion 31. Furthermore, in this modification, the smaller rectangular screen portion 31 is formed at leading and base sections thereof with inward projections 31a and 31b which are in contact with the outer surface of the shell 3. Due to this contact, the rough inside surface part 42 is suppressed from contacting the outside surface of the shell 3.

As is described hereinabove, preferably, the thickness "T" of the metal plate material for producing the shutter 7 is about 0.3 mm. However, when the above-mentioned production method is employed, much thinner metal plate material can be used. In fact, a metal plate material of the thickness ranging from about 0.15 mm to about 0.5 mm can be used for production of the shutter 7. It has been revealed that if the thickness is greater than 0.5 mm, there is no need of providing the rough inside surface part 42 behind the rough outside surface part 41. That is, in this case, the stress or compression strain produced upon stamping the rough outside surface part 41 is effectively dispersed and absorbed in the direction of the thickness of the metal plate material. It has been further revealed that if the thickness is less than 0.15 mm, satisfied rough outside surface part 41 is not provided. That is, in this case, the stress or compression strain produced upon stamping both the rough outside and inside surface parts 41 and 42 is not effectively dispersed nor adsorbed due to the too thin structure of the metal plate material.

The entire contents of Japanese Patent Application 2000-112822 (filed Apr. 14, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A metal shutter for use with a disc cartridge, comprising:

larger and smaller rectangular screen portions which are connected through a thinner connecting portion thereby to have a generally U-shaped cross section, said smaller rectangular screen portion having an inside surface which faces an inside surface of said larger rectangular screen portion and an outside surface which faces outside;

a first stamped rough outside surface part integral with said outside surface of said smaller rectangular screen portion;

a non-rough outside surface part integral with said outside surface of said smaller rectangular screen portion, said non-rough outside surface being surrounded by said first stamped rough outside surface part thereby to constitute a given pattern which stands out against said stamped rough outside surface part;

a first stamped rough inside surface part which is integral with said inside surface of said smaller rectangular screen portion at a position corresponding to said first stamped rough outside surface part;

a second stamped rough outside surface part integral with said outside surface of said smaller rectangular screen portion at a position remote from said first stamped rough outside surface part, said second stamped rough outside surface part being configured to form a given pattern; and a second stamped rough inside surface part integral with said inside surface of said smaller rectangular screen portion at a position corresponding to said second stamped rough outside surface part.

2. A metal shutter as claimed in claim 1, further comprising a third stamped rough inside surface part integral with said inside surface of said smaller rectangular screen portion at a position corresponding to said non-rough outside surface part.

3. A metal shutter as claimed in claim 1, further comprising:
- a first inward projection integrally formed on a first portion of said inside surface of said smaller rectangular screen portion; and
- a second inward projection integrally formed on a second portion of said inside surface of said smaller rectangular screen portion,
  - said first and second inward projections being in contact with an outer surface of a shell of said disc cartridge.

4. A disc cartridge including a metal shutter of aluminum plate material for use with said disc cartridge comprising:
- an elongate opening included on each side of said disc cartridge to expose an outer surface of a disc therein;
- one opening being more elongate than the opening on the other side;
- said shutter comprising a longer rectangular portion to cover said more elongate opening a shorter rectangular portion to cover said elongate opening; and
- said rectangular portions being interconnected by an edge portion;
- said shutter including a screen portion which has an outside surface of one of said rectangular portions with an indication area, said indication area including a stamped rough surface part which is configured to constitute a given pattern, said screen portion being formed on an inside surface thereof at a portion corresponding to said indication area with another rough surface area; and
- said indication area further includes a non-rough surface part which is configured to surround said stamped rough surface part to allow said stamped rough surface part to stand out against the non-rough surface part.

5. A disc cartridge including a metal shutter of aluminum plate material for use with said disc cartridge comprising:
- an elongate opening included on each side of said disc cartridge to expose an outer surface of a disc therein;
- one opening being more elongate than the opening on the other side;
- said shutter comprising a longer rectangular portion to cover said more elongate opening a shorter rectangular portion to cover said elongate opening; and
- said rectangular portions being interconnected by an edge portion;
- said shutter including a screen portion which has an outside surface of one of said rectangular portions with an indication area, said indication area including a stamped rough surface part which is configured to constitute a given pattern, said screen portion being formed on an inside surface thereof at a portion corresponding to said indication area with another rough surface area; and
- said indication area further includes a non-rough surface part which is surrounded by said stamped rough surface part to allow said non-rough surface part to stand out against the stamped rough surface part.

6. A disc cartridge as claimed in claim 4 or 5, in which said metal shutter is constructed of a metal plate having a thickness ranging from approximately 0.15 mm to approximately 0.5 mm.

7. A disc cartridge as claimed in claim 4 or 5, in which the roughness of the stamped rough surface area on said inside surface of said screen portion is less than that of the stamped rough surface area on said outside surface of said screen portion.

8. A disc cartridge as claimed in claim 4 or 5, in which said indication area is provided on a flat projection formed on said screen portion.

* * * * *